US012723409B2

(12) United States Patent
Izmit et al.

(10) Patent No.: US 12,723,409 B2
(45) Date of Patent: Sep. 1, 2026

(54) CONCRETE REINFORCEMENT MEMBER

(71) Applicant: KORDSA TEKNIK TEKSTIL A.S., Kocaeli (AR)

(72) Inventors: Ilhan Izmit, Kocaeli (AR); Burak Erdal, Kocaeli (AR); Ugur Alparslan, Kocaeli (AR)

(73) Assignee: AFYON CIMENTO SANAYI TURK ANONIM SIRKETI, Istanbul (TR)

(*) Notice: Subject to any disclaimer, the term of this patent is extended or adjusted under 35 U.S.C. 154(b) by 639 days.

(21) Appl. No.: 17/914,775

(22) PCT Filed: Apr. 8, 2020

(86) PCT No.: PCT/TR2020/050301

§ 371 (c)(1),
(2) Date: Sep. 27, 2022

(87) PCT Pub. No.: WO2021/194439

PCT Pub. Date: Sep. 30, 2021

(65) Prior Publication Data

US 2023/0332406 A1 Oct. 19, 2023

(51) Int. Cl.

*E04C 5/07* (2006.01)
*C04B 16/06* (2006.01)
*C04B 20/00* (2006.01)

(52) U.S. Cl.

CPC .......... *E04C 5/073* (2013.01); *C04B 16/0633* (2013.01); *C04B 20/0068* (2013.01)

(58) Field of Classification Search

CPC . E04C 5/073; E04C 5/07; E04C 5/076; C04B 16/0633; C04B 20/0068; C04B 28/02; D07B 2201/2008; D07B 2205/201; D07B 5/005; D07B 2501/2023

See application file for complete search history.

(56) References Cited

U.S. PATENT DOCUMENTS

| | | | | |
|---|---|---|---|---|
| 5,628,822 | A | 5/1997 | Hogan | |
| 6,780,367 | B2 * | 8/2004 | Pyzik | C04B 16/0633 264/171.23 |
| 8,496,861 | B2 * | 7/2013 | Kaufmann | E04C 5/076 264/210.8 |
| 2004/0081816 | A1 * | 4/2004 | Pyzik | C04B 20/0048 428/297.4 |
| 2013/0324643 | A1 * | 12/2013 | Tanaka | C04B 28/02 524/8 |

FOREIGN PATENT DOCUMENTS

| | | | |
|---|---|---|---|
| EP | 1070025 | A1 | 1/2001 |
| EP | 1253223 | A2 | 10/2002 |
| EP | 2650125 | A1 | 10/2013 |
| JP | 2004018352 | A | 1/2004 |
| JP | 2005089198 | A | 4/2005 |
| JP | 2009234796 | A | 10/2009 |
| WO | 9743502 | A1 | 11/1997 |
| WO | 2008038658 | A1 | 4/2008 |

OTHER PUBLICATIONS

EN 14651, Test method for metallic fibre concrete—Measuring the flexural tensile strength (limit of proportionality (LOP), residual), European Committee for Standardization, 2007, pp. 1-17.

* cited by examiner

*Primary Examiner* — Amber R Orlando
*Assistant Examiner* — Anastasia A. Kuvayskaya
(74) *Attorney, Agent, or Firm* — Bayramoglu Law Offices LLC

(57) ABSTRACT

A reinforcement member suitable for being used to reinforce concrete comprises synthetic fiber with the ratio of its length to equivalent diameter being in range of 30 to 300—and having embossments which extend from its outer surface to outside on the outer surface such that they will form protrusions and have depth in range of 0.10 mm to 0.35 mm. The reinforcement member is in a range of 0.9 kg to 27.3 kg in 1 $m^3$ of concrete. The synthetic fibers are manufactured from polypropylene.

14 Claims, No Drawings

CONCRETE REINFORCEMENT MEMBER

CROSS REFERENCES TO THE RELATED APPLICATIONS

The application is the national phase entry of International Application No. PCT/TR2020/050301, filed on Apr. 8, 2020, which is based on and claims priority on Turkish patent application No. 2020/04801, filed on Mar. 27, 2020, the entire contents of which are incorporated herein by reference.

TECHNICAL FIELD

The present invention relates to a reinforcement member which is suitable for reinforcing concrete and comprises synthetic fiber.

BACKGROUND

Concrete, which is a construction material that is commonly used in the construction sector, is widely preferred due to its easy formability, having wide application area and pressure resistance. However, in addition to these advantages, the concrete has disadvantages such as being brittle, not being flexible, being composite material, and thus having very low tensile strength. Due to the aforementioned reasons, it is common practice in the art to place steel rods in tensile regions so that the concrete can meet the stresses in the said regions. However, although the tensile strength of the concrete structure is increased by the use of steel rods as reinforced concrete fittings, due to the fact that steel cannot be placed properly, application difficulties are experienced and the steel rods that are applied being corroded in time due to the micro cracks occurring on the concrete decrease service life and thus cause technical problems in the said application in long term.

In the state of the art, there are various concrete reinforcement applications developed in order to overcome the abovementioned disadvantages. One of the applications that have been mentioned (Slab-on-Ground concretes, Shotcrete, Tunnel Lining Concretes, Topping concretes, Precast Elements (Concrete Pipe, Gutter, Siding coatings etc.) is the use of synthetic fibers instead of steel rods. The synthetic fibers used in concrete are divided into two groups as micro-fibers and macro fibers depending on their equivalent diameters. The said equivalent diameter is equal to diameter of a circle having an area equal to the cross-sectional area of the fiber, the equivalent diameter for circular fibers is equal to the diameter of the fibers. Fibers with an equivalent diameter of less than or equal to 0.3 mm are called micro fibers, and fibers with an equivalent diameter of more than 0.3 mm are called macro fibers. A synthetic fiber used in concrete generally increase the load bearing, crack resistance and energy absorption capacity of concrete under displacement, and restricts the plastic and drying shrinkage formed within the concrete.

Reinforcing concrete with macro synthetic fibers is a preferred application since the said materials are lightweight relative to steel and they do not corrode. The fibers used in the said applications are generally acrylic, aramid, carbon, nylon, polyester, polypropylene and polyethylene based.

Even though, in the state of the art, studies performed about the load bearing capacities of the fibers come to the fore, it will not be sufficient to focus only on the bearing capacities. The behavior of fresh concrete has importance in terms of both transferability and being able to giving the desired shape. This situation which is explained with the term processability is negatively affected by increasing the dosage of synthetic fibers used in order to increase the performance; as the amount of fiber increases, the processability of the concrete decreases and it tends to agglomerate as structure.

Patent document no WO9743502A1 discloses synthetic fibers used for reinforcement in concrete. The fibers disclosed in the said document have a length in the range of 50 mm to 75 mm; and has a width of 0.5 mm to 4 mm and a thickness of 0.1 mm to 2 mm. The ends of the said fibers are deformed, and the rest of the fiber body is as smooth as it comes out of production.

Patent document no EP2650125A1 discloses a synthetic fiber, production method of the said fiber and its use as a reinforcement member. The said fiber comprises more than one bundle of monofilament fibers twisted such that the degree of twist is greater than 0.9 turn/inch (about 0.36 turns/cm). In the said document, the mechanical properties of the polypropylene based macro fibers produced as fibril are compared with the other products.

Patent document no U.S. Pat. No. 5,628,822A discloses a fiber additive which is used for reinforcing concrete. The denier of the said fiber within the concrete is in range of 3 to 5000; its length is in range of 0.16 to 7.6 cm.

Patent document no EP1070025A1 discloses reinforced building materials comprised of an inorganic binding material and synthetic fibers. The fibrous material employed in invention formulations is capable of undergoing progressive fibrillation upon agitation; therefore it can be added in higher amounts into the building material.

SUMMARY

In the present invention, a reinforcement member is developed, which is subjected to surface treatment, the geometry and surface forms of which have the ability to improve its distribution within the concrete, which does not form agglomerate, and which comprises synthetic fiber.

The reinforcement member suitable for being used to reinforce concrete developed with the present invention comprises synthetic fiber with the ratio of its length to equivalent diameter being in range of 30 to 300 and having embossments which extend from its outer surface to outside on the said outer surface such that they will form protrusions and have depth in range of 0.10 mm-0.35 mm.

The reinforcement member of the present invention holds onto the concrete properly by means of the embossments provided on its surface, and it distributes homogenously inside the concrete by means of its dimensional properties. In terms of labor and cost, the said application is advantageous before the existing applications, and the negative effect of the fiber amount on the processability of the concrete is reduced.

The objective of the present invention is to develop a reinforcement member which is suitable for use in concrete, comprising synthetic fiber, and a concrete reinforced with a fiber comprising the said reinforcement member.

Another objective of the present invention is to develop a reinforcement member which provides homogenous distribution in the concrete, which does not form agglomerate, which comprises synthetic fiber, and a concrete reinforced with a fiber comprising the said reinforcement member.

Another objective of the present invention is to develop a reinforcement member which is subjected to surface treatment and which does not form agglomerate when added into the concrete and which comprises synthetic fiber, and a concrete reinforced with a fiber comprising the said reinforcement member.

DETAILED DESCRIPTION OF THE EMBODIMENTS

Since the tensile strength of the concrete, which is a widely used construction material in construction sector, is quite low, it is common practice in the art to place steel rods in the tensile regions of the concrete. However, due to the fact that the steel is a heavy material, the application difficulties are experienced and the fact that the steel rods oxidize in time due to the micro cracks occurring on the concrete, the said application causes technical problems in the long term. In applications for increasing the tensile strength of the concrete by means of synthetic fibers as structural fittings, the compatibility of the said fibers is provided with mechanical forces, and therefore (in order to increase adherence between the concrete and the fiber) surface treatments such as embossing, crimping and corrugations should be applied on the said fibers. In addition, the processability of concrete is adversely affected by increasing the dosage of synthetic fibers; as the amount of fiber increases, the processability of concrete decreases and it tends to structurally agglomerate. For this reason, with the present invention a reinforcement member is developed, which is subjected to surface treatment, the geometry and surface forms of which have the ability to improve its distribution within the concrete, which does not form agglomerate, and which comprises synthetic fiber.

The reinforcement member suitable for being used to reinforce concrete developed with the present invention comprises synthetic fibers with the ratio of its length to its equivalent diameter (length/equivalent diameter) being in range of 30 to 300 and having embossments which extend from its outer surface to outside on the said outer surface such that they will form protrusions and have depth (the distance between a peak point of the protrusion and the outer surface of the fiber in range of 0.1 mm-0.35 mm.

The said synthetic fibers can be in form of a cylindrical or tetragonal rod, the length of the fiber is equal to the length of its long edge, and its equivalent diameter is equal to the diameter of a circle having an area equal to the cross-sectional (section of said long edge taken at an angle perpendicular to said long edge) area. By means of the ratio of the length of the fiber of the invention to the equivalent diameter (aspect ratio) being in the range of 30 to 300, the fiber is homogeneously distributed in the cement and agglomerate formation is prevented. The embossments on the outer surface of the fiber allow the fiber to adhere with cement and thereby increase the tensile strength.

In a preferred embodiment of the invention, the raw material of the said fibers is manufactured from polypropylene. Up to 30% Polyethylene, Polyethyleneterephthalate or Polyamide 6,6 can be added to the raw material. The said fibers can be singular or in bundle form, and can be applied into the concrete in both ways.

The distribution of the reinforcement member of the present invention was evaluated with the tests that were performed. The characteristics of the reinforcement member used in the said tests are given in Table 1. The aspect ratio in Table 1 shows the ratio of the length of the fibers comprised by the reinforcement member to its equivalent diameter. The specified fibers are added into the concrete in bundles, and the said bundles are in form of a cylinder having bundle diameter stated in Table 1.

TABLE 1

| Fiber length (mm) | Equivalent Diameter (mm) | Aspect ratio | Bundle diameter (mm) | Raw material |
|---|---|---|---|---|
| 40 | 0.36 | 111 | 55 | Polypropylene, |
| 40 | 1.08 | 37 | 55 | Polypropylene, |
| 48 | 0.36 | 133 | 55 | Polypropylene, |
| 48 | 1.08 | 44 | 55 | Polypropylene, |
| 54 | 0.36 | 150 | 55 | Polypropylene, |
| 54 | 1.08 | 50 | 55 | Polypropylene, |
| 80 | 0.36 | 222 | 55 | Polypropylene, |
| 80 | 1.08 | 74 | 55 | Polypropylene, |

The synthetic fibers were tested according to EN 14651 standard during the performed tests. The results of the tests are shown in Table 2.

TABLE 2

| Sample | | | | | | EN 14651 (Test method for fibre concrete. Measuring the flexural tensile strength (limit of proportionality (LOP), residual) | |
|---|---|---|---|---|---|---|---|
| | | | | | | fr1 (0.5 mm Crack width | fr4(3.5 mm Crack width |
| Fiber length (mm) | Equivalent diameter (mm) | Aspect ratio | Bundle diameter (mm) | Raw material | Fiber dosage | Residual strength, Mpa) | Residual strength, Mpa) |
| 40 | 0.36 | 111 | 55 | Polypropylene, 100% | 3 kg/m3 | 1.5 | 1.5 |
| 40 | 1.08 | 37 | 55 | Polypropylene, 100% | 3 kg/m3 | 1.5 | 1.6 |
| 48 | 0.36 | 133 | 55 | Polypropylene, 100% | 3 kg/m3 | 1.5 | 1.7 |
| 48 | 1.08 | 44 | 55 | Polypropylene, 100% | 3 kg/m3 | 1.5 | 1.7 |
| 54 | 0.36 | 150 | 55 | Polypropylene, 100% | 3 kg/m3 | 1.6 | 1.7 |
| 54 | 1.08 | 50 | 55 | Polypropylene, 100% | 3 kg/m3 | 1.6 | 1.8 |
| 80 | 0.36 | 222 | 55 | Polypropylene, 100% | 3 kg/m3 | 1.7 | 1.6 |

TABLE 2-continued

| Sample | | | | | | EN 14651 (Test method for fibre concrete. Measuring the flexural tensile strength (limit of proportionality (LOP), residual) | |
|---|---|---|---|---|---|---|---|
| | | | | | | fr1 (0.5 mm Crack width | fr4(3.5 mm Crack width |
| Fiber length (mm) | Equivalent diameter (mm) | Aspect ratio | Bundle diameter (mm) | Raw material | Fiber dosage | Residual strength, Mpa) | Residual strength, Mpa) |
| 80 | 1.08 | 74 | 55 | Polypropylene, 100% | 3 kg/m3 | 1.7 | 1.8 |
| Non-fibrous concrete | | | | | | 0.2 | 0 |

As seen in Table 2, fr1 (0.5 mm crack width residual strength, Mpa) and fr4 (0.5 mm crack width residual strength, Mpa) residual strengths are provided with the fibers that have been used. Therefore, the reinforcement member of the present invention can play an effective role in concrete.

The synthetic fibers are added into the concrete generally by two different methods. The first one of these methods is to make fiber concrete mixture by means of adding fiber in a determined dosage into concrete transmixers. In this method, preferably 4 to 10 kg/min fiber is closed and mixer rotation (drum) is applied to be a speed of 40 rpm minimum. Another application method is to add the fibers to the aggregate band in concrete production plants, to blend all the materials (aggregate, water, cement, chemical and mineral additives+synthetic fiber) contained in the concrete in a single panmixer, and to produce concrete preferably in the range of 20-120 seconds. The reinforcement members of the present invention distribute homogeneously into the concrete in both methods. Furthermore, it is determined that the reinforcement element of the present invention is suitable for use up to a ratio of 0.1%-3% in concrete. The volumetric specific weight of the fiber of the present invention is 910 kg/m$^3$ and its usage in concrete in a ratio of 0.1% to 3% corresponds to the use of 0.9 kg to 27.3 kg of fiber in 1 m$^3$ of concrete. Therefore, with the present invention a fiber reinforced concrete is also developed which comprises the said reinforcement member in the specified ratios.

In a preferred embodiment of the invention, the ratio of the concrete formed with the reinforcement member of the invention to the total rough aggregate ratio (ratio of aggregate to total concrete) is equal to or greater than 55. In a preferred embodiment of the invention, the said reinforcement member in is mixed into the concrete in bundles, wherein diameter of the specified bundle is preferably equal to or greater than 20 mm and equal to or smaller than 80 mm (20 mm≤the diameter of the bundle≤80 mm). The said bundles are formed by arranging polypropylene fibers side by side as to form a bundle and wrapping a water-soluble material (eg PVA) around outside of the bundle that is formed. The said fibers are brought into bundle form preferably by bringing the fibers side by side to form a cylinder form in a desired diameter and coating the outer surface of the formed cylinder with the specified material such that its upper and lower (circular) surfaces will remain open.

In a preferred embodiment of the invention, the said embossments provided on the outer surface of the said fibers can be in elliptical or quadrangle form. In the said embodiment, a short edge of said embossments is in the range of 0.10 mm-0.40 mm; a long side is in the range of 0.20 mm-0.90 mm. The said short and long edges correspond to the short diameter and long diameter of the ellipse for embossments in form of ellipse. In a preferred embodiment of the invention, the said embossments are placed with intervals on the surface of the fiber, with a distance of 0.20 mm to 0.80 mm between the embossments. The said distance is the distance between two embossments provided on the said fiber surface and being neighbor to each other in any direction.

As a result of the tests that have been performed, it has been seen that the best fixing values are obtained when the depth of the embossments on the synthetic fibers contained in the reinforcement member of the invention is in the range of 0.10 mm-0.35 mm. In case the depth exceeds the specified range, there is a decrease in the tensile loads carried by the concrete due to the insufficient tensile strength of the section and the inability to adhere to the cement paste. Table 3 shows the results of the EN 14651 test carried out with reinforcement members comprising embossments with different depth values. In the said table, the values of Fr1 and Fr4 (residual tensile values) are shown, which are obtained as a result of testing with concrete containing reinforcement member in which the depth of embossment is in three different ranges.

TABLE 3

| | Concrete Test Results | |
|---|---|---|
| Embossment Depth | $F_{r1}$ (0.5 mm crack mouth, Residual Tensile Strength, Mpa) | $F_{r4}$ (3.5 mm crack mouth, Residual Tensile Strength, Mpa) |
| <0.10 mm | 1.2 | 1.3 |
| 0.10-0.35 mm | 1.5 | 1.8 |
| >0.35 mm | 1.1 | 1.2 |

Accordingly, the results of the tests carried out with the use of synthetic fibers having the properties of embossment depth and Aspect ratio in the reinforcement member of the invention are given in Table 5 and the properties of the reinforcement members used in these tests are given in Table 4.

TABLE 4

| Sample | | | | Embossment |
|---|---|---|---|---|
| Fiber length (mm) | Equivalent diameter (mm) | Aspect ratio | Bunddle diameter (mm) | depth Embossment depth |
| 40 | 0.36 | 111 | 55 | 0.10-0.35 mm |
| 40 | 1.08 | 37 | 55 | 0.10-0.35 mm |

TABLE 4-continued

| Sample | | | | Embossment |
|---|---|---|---|---|
| Fiber length (mm) | Equivalent diameter (mm) | Aspect ratio | Bunddle diameter (mm) | depth Embossment depth |
| 48 | 0.36 | 133 | 55 | 0.10-0.35 mm |
| 48 | 1.08 | 44 | 55 | 0.10-0.35 mm |
| 54 | 0.36 | 150 | 55 | 0.10-0.35 mm |
| 54 | 1.08 | 50 | 55 | 0.10-0.35 mm |
| 80 | 0.36 | 222 | 55 | 0.10-0.35 mm |
| 80 | 1.08 | 74 | 55 | 0.10-0.35 mm |

In tests carried out with concrete containing reinforcement members in Table 4, the process of mixing synthetic fibers into the concrete was performed in concrete transmixers with a large volume (for example volume of 7 $m^3$), with a dosage of 3 kg/$m^3$ (3 kg reinforcement member in 1 $m^3$ concrete). As it seen in Table 5, when the reinforcement member of the present invention is applied in different types of concrete, it shown a homogenous distribution in the concrete. In the said tests, dosing was done by feeding the synthetic fibers collected in bundles into the transmixer as packs of 3 kg. The said packs comprise the specified amount (3 kg) of reinforcement member in bundle form, located in paper material dissolved in concrete.

TABLE 5

| Test | Concrete Class | Slump Class cm | Mixer speed (rpm) | Mixer rotation time (dk) | Fiber length (mm) | Fiber equivalent diameter (mm) | Fiber bundle diameter (mm) | Homogenous Distribution test Result |
|---|---|---|---|---|---|---|---|---|
| 1 | C25/30 | 10_21 | 40-100 | 7 | 40-48-54-80 | 0.36-1.08 | 20-80 | Homogeneous distribution |
| 2 | C25/30 | 10_21 | 40-100 | 10 | 40-48-54-80 | 0.36-1.08 | 20-80 | Homogeneous distribution |
| 3 | C25/30 | 10_21 | 40-100 | 7 | 40-48-54-80 | 0.36-1.08 | 20-80 | Homogeneous distribution |
| 4 | C30/37 | 10_21 | 40-100 | 7 | 40-48-54-80 | 0.36-1.08 | 20-80 | Homogeneous distribution |
| 5 | C35/45 | 10_21 | 40-100 | 7 | 40-48-54-80 | 0.36-1.08 | 20-80 | Homogeneous distribution |
| 6 | C25/30 | 10_21 | 40-100 | 7 | 40-48-54-80 | 0.36-1.08 | 20-80 | Homogeneous distribution |
| 7 | C30/37 | 10_21 | 40-100 | 7 | 40-48-54-80 | 0.36-1.08 | 20-80 | Homogeneous distribution |
| 8 | C25/30 | 10_21 | 40-100 | 7 | 40-48-54-80 | 0.36-1.08 | 20-80 | Homogeneous distribution |
| 9 | C30/37 | 10_21 | 40-100 | 7 | 40-48-54-80 | 0.36-1.08 | 20-80 | Homogeneous distribution |
| 10 | C35/45 | 10_21 | 40-100 | 7 | 40-48-54-80 | 0.36-1.08 | 20-80 | Homogeneous distribution |
| 11 | C25/30 | 10_21 | 40-100 | 7 | 40-48-54-80 | 0.36-1.08 | 20-80 | Homogeneous distribution |
| 12 | C30/37 | 10_21 | 40-100 | 7 | 40-48-54-80 | 0.36-1.08 | 20-80 | Homogeneous distribution |
| 13 | C35/45 | 10_21 | 40-100 | 7 | 40-48-54-80 | 0.36-1.08 | 20-80 | Homogeneous distribution |
| 14 | C30/37 | 10_21 | 40-100 | 7 | 40-48-54-80 | 0.36-1.08 | 20-80 | Homogeneous distribution |
| 15 | C45/55 | 10_21 | 40-100 | 7 | 40-48-54-80 | 0.36-1.08 | 20-80 | Homogeneous distribution |
| 16 | C45/55 | 10_21 | 40-100 | 10 | 40-48-54-80 | 0.36-1.08 | 20-80 | Homogeneous distribution |

The said tests are numbered from 1 to 17, in columns in Table 5 the concrete class used in the tests, the slump class showing the flow ability of the concrete, rotation speed and time of the mixer during processes of adding the reinforcement member into the concrete and mixing, length of the fiber used in experiments, fiber equivalent diameter (given as a range), the diameter of the formed fiber bundles and the result of the homogeneous test that was performed were shown respectively. As a result of the said tests, it is seen that the reinforcement members of the present invention, the Aspect ratio of which is between 30 and 300 are homogeneously distributed in the concrete.

In a preferred embodiment of the present invention, the length of the fibers comprised by the said reinforcement member is in range of 40 mm-80 mm. In another preferred embodiment of the present invention, the equivalent diameter of the said fibers is in range of 1.08 mm-0.36 mm and preferably in range of 0.76 mm-0.68 mm.

The reinforcement member of the present invention holds onto the concrete properly by means of the swellings provided on its surface, and it distributes homogenously inside the concrete by means of its dimensional properties. In terms of labor and cost, the said application is advantageous before the existing applications, and the negative effect of the fiber amount on the processability of the concrete is reduced by means of the present invention.

What is claimed is:

1. A reinforcement member used to reinforce concrete, comprising synthetic fibers with a ratio of a length to an equivalent diameter being in range of 30 to 300, wherein embossments extending from outer surfaces of the synthetic fibers to outside form protrusions on the outer surfaces of the synthetic fibers, and have depth in range of 0.10 mm to 0.35 mm, the reinforcement member is in a range of 0.9 kg to 27.3 kg in 1 $m^3$ concrete, and the synthetic fibers are manufactured from polypropylene, wherein the embossments are in form of quadrangle or elliptical form, wherein the embossments are positioned on the outer surfaces of the synthetic fibers with intervals, the distance between two adjacent embossments being from 0.20 mm to 0.80 mm, wherein the length of the synthetic fibers comprised by the reinforcement member is in range of 40 mm to 80 mm, and wherein a tensile strength of the synthetic fibers comprised by the reinforcement member is in range of 300 to 800 MPa.

2. The reinforcement member according to claim 1, wherein a short edge of the embossments is in range of 0.10 mm to 0.40 mm and a long edge is in range of 0.20 mm to 0.90 mm.

3. The reinforcement member according to claim 2, wherein the embossments are positioned on the outer surfaces of the synthetic fibers with intervals, the distance between two adjacent embossments is being from 0.20 mm to 0.80 mm.

4. The reinforcement member according to claim 1, wherein a short diameter of the embossments is in range of 0.10 mm to 0.35 mm and a long diameter is in range of 0.40 mm to 0.70 mm.

5. The reinforcement member according to claim 1, wherein the outer surfaces of the synthetic fibers with a diameter of equal to or greater than 0.3 mm and an aspect ratio of 30-300 are wrapped with a water soluble material and in form of cylindrical bundles.

6. The reinforcement member according to claim 5, wherein a diameter of the cylindrical bundles is in range of 20 mm to 80 mm.

7. The reinforcement member according to claim 1, wherein polyethylene is added into the polypropylene used as a raw material.

8. The reinforcement member according to claim 1, wherein polyethyleneterephthalate is added into the polypropylene used as a raw material.

9. The reinforcement member according to claim 1, wherein polyamide 6.6 is added into the polypropylene used as a raw material.

10. The reinforcement member according to claim 1, wherein the equivalent diameter of the synthetic fibers comprised by the reinforcement member is in range of 1.08 mm to 0.36 mm.

11. The reinforcement member according to claim 1, wherein the equivalent diameter of the synthetic fibers comprised of the reinforcement member is in range of 0.76 mm to 0.68 mm.

12. The reinforcement member according to claim 1, wherein the embossments are positioned on the outer surfaces of the synthetic fibers with intervals, the distance between two adjacent embossments is being from 0.20 mm to 0.80 mm.

13. A reinforcement member used to reinforce concrete, comprising synthetic fibers with a ratio of a length to an equivalent diameter being in range of 30 to 300, wherein embossments extending from outer surfaces of the synthetic fibers to outside form protrusions on the outer surfaces of the synthetic fibers, and have depth in range of 0.10 mm to 0.35 mm, the reinforcement member is in a range of 0.9 kg to 27.3 kg in 1 $m^3$ of concrete, and the synthetic fibers are manufactured from polypropylene, wherein the embossments are in form of quadrangle or elliptical form, wherein the embossments are positioned on the outer surfaces of the synthetic fibers with intervals, the distance between two adjacent embossments being from 0.20 mm to 0.80 mm, wherein the length of the synthetic fibers comprised by the reinforcement member is in range of 40 mm to 80 mm, and wherein an elastic modulus of the synthetic fibers comprised by the reinforcement member is in range of 5 to 15 Gpa.

14. A reinforcement member used to reinforce concrete, comprising synthetic fibers with a ratio of a length to an equivalent diameter being in range of 30 to 300, wherein embossments extending from outer surfaces of the synthetic fibers to outside form protrusions on the outer surfaces of the synthetic fibers, and have depth in range of 0.10 mm to 0.35 mm, the reinforcement member is in a range of 0.9 kg to 27.3 kg in 1 $m^3$ of concrete, and the synthetic fibers are manufactured from polypropylene, wherein the embossments are in form of quadrangle or elliptical form, wherein the embossments are positioned on the outer surfaces of the synthetic fibers with intervals, the distance between two adjacent embossments being from 0.20 mm to 0.80 mm, wherein the length of the synthetic fibers comprised by the reinforcement member is in range of 40 mm to 80 mm, and wherein a dtex value of the synthetic fibers comprised by the reinforcement member is in range of 650 to 8000.

* * * * *